(12) United States Patent
Joshi

(10) Patent No.: US 7,730,049 B2
(45) Date of Patent: *Jun. 1, 2010

(54) METHOD FOR REPRESENTING THE VERTICAL COMPONENT OF ROAD GEOMETRY AND COMPUTING GRADE OR SLOPE

(75) Inventor: Rajashri Joshi, Chicago, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/304,507

(22) Filed: Dec. 15, 2005

(65) Prior Publication Data

US 2006/0149780 A1    Jul. 6, 2006

Related U.S. Application Data

(63) Continuation of application No. 09/970,233, filed on Oct. 3, 2001, now Pat. No. 7,007,011.

(51) Int. Cl.
*G06F 17/00* (2006.01)
*G06F 7/00* (2006.01)

(52) U.S. Cl. ................................ 707/706; 707/741

(58) Field of Classification Search ................ None
See application file for complete search history.

(56) References Cited

U.S. PATENT DOCUMENTS

| 3,069,654 | A |   | 12/1962 | Hough | 382/281 |
|---|---|---|---|---|---|
| 5,243,524 | A |   | 9/1993 | Ishida et al. | 701/28 |
| 5,694,322 | A |   | 12/1997 | Westerlage et al. | 705/417 |
| 5,904,725 | A | * | 5/1999 | Iisaka et al. | 701/207 |
| 5,922,036 | A | * | 7/1999 | Yasui et al. | 701/28 |
| 5,970,481 | A | * | 10/1999 | Westerlage et al. | 705/417 |
| 6,029,173 | A | * | 2/2000 | Meek et al. | 707/102 |
| 6,138,084 | A | * | 10/2000 | Mine | 702/157 |
| 6,265,991 | B1 |   | 7/2001 | Nishiwaki et al. | 340/903 |
| 6,266,442 | B1 |   | 7/2001 | Laumeyer et al. | 382/190 |
| 6,732,046 | B1 |   | 5/2004 | Joshi | 701/208 |
| 6,747,576 | B2 | * | 6/2004 | Schaefer | 340/945 |

OTHER PUBLICATIONS

Innes, J.D., The Engineering of Roads (4 pages) (2001), http://www.unb.ca/web/transpo/mynet/mtu74.htm.
Air Force Joint Pamphlet, Planning and Design of Roads, Airfields, and Heliports in the Theater of Operations—Road Design, Field Manual No. 5-430-00-1, No. 32-8013, vol. 1 (1994) http://www.adtdl.army.mil/cgi-bin/atdl.dll/fm/5-430-00-1/CH9.htm.
Fisher, Robert B., "Feature Space Transformation for line detection," Available in Cvonline Compendium of Computer Vision, (2001) http://www.dai.ed.ac.uk/cVouline.
Vandegrift, C.J., et al., Unit 7: Route Surveying, LS/LSIT Video Exam preparation course workbook, Caltrans Geometronics (1993).

* cited by examiner (Continued)

*Primary Examiner*—Baoquoc N To
(74) *Attorney, Agent, or Firm*—Jon D. Shutter; Frank J. Kozak; Lisa M. Schoedel

(57) ABSTRACT

A geographic database represents roads including an altitudinal component of the geometry of the roads. The altitudinal component of the geometry of roads is represented using data that indicate straight line segments and vertical curves, in particular parabolic vertical curves. The straight lines and vertical curves are determined by providing data, indicating the altitude at a plurality of locations along portions of roads, as an input to a Hough transform to determine the straight line segments and vertical curves that coincide with the portions of the roads vertically. Then, data that define the straight line segments and vertical curves are stored to represent the altitudinal component of the geometry of the portions of the roads in the geographic database. The altitudinal variation of roads is thus expressed in closed form. From this closed form representation, the slope or grade at any point along the road can be easily computed.

18 Claims, 4 Drawing Sheets

METHOD FOR REPRESENTING THE VERTICAL COMPONENT OF ROAD GEOMETRY AND COMPUTING GRADE OR SLOPE

REFERENCE TO RELATED APPLICATION

The present application is a continuation of Ser. No. 09/970,233 filed Oct. 3, 2001, now U.S. Pat. No. 7,007,011, the entire disclosure of which is incorporated herein by reference. The present application is related to the application entitled "APPLICATION OF THE HOUGH TRANSFORM TO MODELING THE HORIZONTAL COMPONENT OF ROAD GEOMETRY AND COMPUTING HEADING AND CURVATURE" filed on the same date herewith, now U.S. Pat. No. 6,732,046, the entire disclosure of which is incorporated by reference herein.

BACKGROUND OF THE INVENTION

The present invention relates generally to geographic databases and, more particularly, the present invention relates to a way to represent the altitudinal component of road geometry in a geographic database and a method for forming the representation.

Geographic databases have many uses. Geographic databases are used in navigation systems to display maps and provide route calculation and guidance. Geographic databases are also used by Internet sites to provide navigation-related features and services.

In many conventional geographic databases, a linearly extending geographic feature, such as a road, a river, or a state or municipal boundary, is represented using a series of discrete points. For example, in the case of roads, each road segment is represented by two nodes that represent the end points of the road segment, and optionally by one or more shape points that represent points along the road segment between the two nodes. Data that define each of these points (e.g., latitude, longitude, and altitude) are stored in a geographic database to represent this road segment.

Although this way of representing roads and other linearly extending geographic features works well for many applications, there is room for improvement. One area in which there exists a need for improvement relates to the representation of altitude (or altitude changes) along a road. A large number of shape points may be needed to accurately represent the actual shape of the road that has many vertical changes. Storing large numbers of shape points increases the overall size of the geographic database thereby increasing the cost of the data storage medium. Increasing the overall size of the geographic database may also require that systems that use the geographic database have faster and more powerful processors or more memory.

Accordingly, there is a need for a space efficient model for representing and storing altitude information relating to roads.

SUMMARY OF THE INVENTION

To address these and other objectives, an embodiment of the present invention provides for representing the altitudinal component of the geometry of roads in a geographic database using data that indicate straight line segments and parabolic vertical curves. The straight lines and parabolic vertical curves are determined by providing data indicating the altitude at a plurality of locations along portions of roads as an input to a Hough transform to determine the straight lines and vertical curves that coincide with the portions of the roads. Then, data that define the straight lines and vertical curves are stored in the geographic database to represent the altitudinal component of the geometry of the portions of the roads.

The data, indicating the altitude at a plurality of positions along roads, which are provided as an input to the Hough Transform, may be obtained from a positioning system located in a vehicle that is driven along roads, or alternatively, the data may be obtained from other sources such as by digitizing paper maps or imagery.

The use of parabolic arcs and line segments to represent the altitudinal component of roads may be advantageous for certain applications that require an accurate representation of road geometry. Such a representation may be a space efficient way to represent roads with a high level of accuracy, because the representation directly exploits the fact that vertical curves are parabolic.

DETAILED DESCRIPTION OF THE PRESENTLY PREFERRED EMBODIMENTS

I. Introduction

Those who develop geographic databases that represent roads have a need for ways to accurately represent roads in three dimensions. In conventional databases, the shapes of roads are represented using shape points. Shape points consist of coordinate pairs (longitude, latitude) or coordinate triples (longitude, latitude, altitude).

A present embodiment relates to a way to represent the vertical (i.e., altitudinal) component of the geometry of a road. The present embodiment provides a representation of the altitude variation in road geometry and an accurate representation of the grade and/or slope of a road. Grade is defined as the altitudinal change per unit change in horizontal distance. Grade may be expressed as a percentage.

Figure 1:
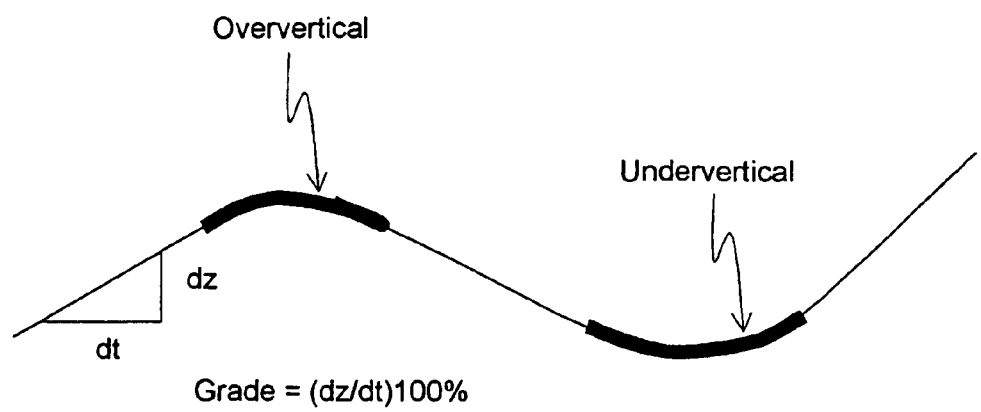
FIG. 1 illustrates a vertical cross section of a road and shows how roads are composed of combinations of straight lines and parabolic vertical curves.

According to a present embodiment, the altitudinal component of a data representation of a road is defined using vertical curves (parabolic arcs) and constant grades (line segments). The vertical curves are used to connect sections of roads that have constant grade. For purposes of this specification, vertical curves at the crest of a hill are called "summit curves" or "oververticals" and vertical curves at the bottom of a hill are called "sag curves" or "underverticals." FIG. 1 shows a cross section of a portion of a road. As shown in FIG. 1, straight lines and vertical curves coincide with the vertical cross section of the portion of the road.

It has been observed that vertical curves of roads are designed to be parabolic in shape. According to a present embodiment, the altitudinal component of a data representation of a road is expressed using equations of straight lines (to represent the constant grades) and parabolas (to represent the vertical curves). Representing the altitudinal component of road geometry in this way provides advantages for some applications. For example, representing the altitudinal component of road geometry using equations of straight lines and parabolas may provide a more accurate representation of the actual road compared to conventional methods, i.e., using shape points. Also, using equations of straight lines and parabolas to represent the altitudinal component of road geometry may be more space efficient than using shape points, for a given level of accuracy. This is because such a representation directly exploits the fact that altitudinal variation of roads is designed using parabolic arcs and straight line segments. Furthermore, the new representation expresses the altitudinal variation of roads in closed form.

II. Use of the Hough Transform for Modeling the Altitudinal Component of Road Geometry One way to determine the straight lines and parabolic curves that form the altitudinal components of data representations of roads is to use the Hough Transform. The Hough Transform is described in U.S. Pat. No. 3,069,654. The Hough Transform can be used for detecting simple shapes, like line segments, circular arcs, and parabolic arcs in an image. For line detection, the Hough transform will find all parameter pairs (m,c) which describe each line segment occurring in the image, where m is slope and c is the y-intercept. For circle detection, the Hough transform will find all parameter triplets (a,b,R) which describe each circle (or arc) occurring in the image, where (a,b) is the center, and R is the radius. For parabola detection, the Hough transform will find all parabolas characterized by the parameter triples (a,b,c). The Hough Transform can be directly applied to detecting line segments and parabolic arcs in vertical curves in road geometry.

The application of the Hough Transform to detecting a parabola of the form $$y=ax^2+c \tag{1}$$

is explained below, as an example of the Hough Transform. Line detection and circle detection can be explained along similar lines. (Detecting a general parabola of the form $y=ax^2+bx+c$ is an extension of this simpler case.)

Figures 2A, 2B:
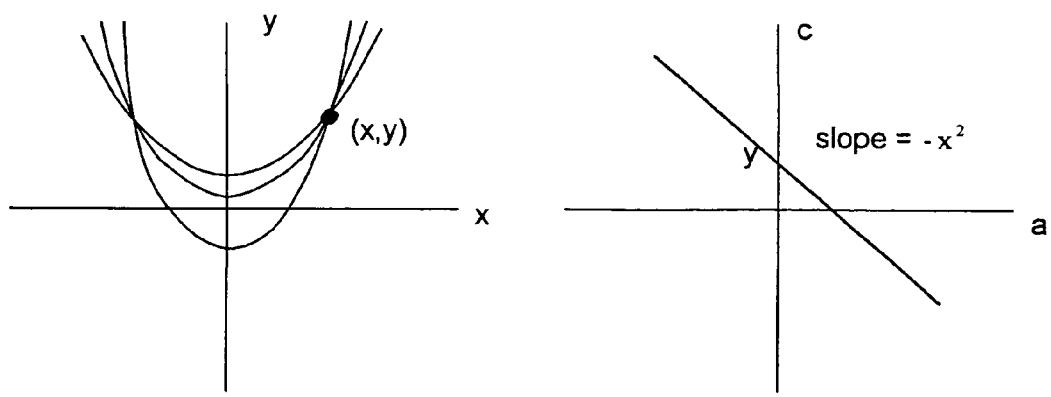
FIGS. 2A and 2B are graphs that illustrate use of the Hough Transform for determining straight lines and parabolas that describe altitude changes along roads.

First, note that for any point (x, y) in the x-y plane, an infinite number of parabolas of the form $y=ax^2+c$ can be drawn through that point, each characterized by a different parameter pair (a,c) as shown in FIG. 2A. Inverting equation (1) provides $c=a(-x^2)+y$ which is the equation of a line in the (a,c) plane with slope $-x^2$ and c-intercept y; i.e., the trajectory in the a-c plane of all of the pairs (a,c) which characterize parabolas which pass through the point (x,y) is a straight line, as shown in FIG. 2B.

Each point (a,c) on this line is the mapping of a single parabola in the x-y plane which passes through (x,y). The entire line in the a-c plane is therefore the mapping of all of the parabolas in the x-y plane which pass through the point (x,y). The parabolic Hough Transform of a point in the x-y plane is thus a straight line in the a-c plane.

Figure 3:
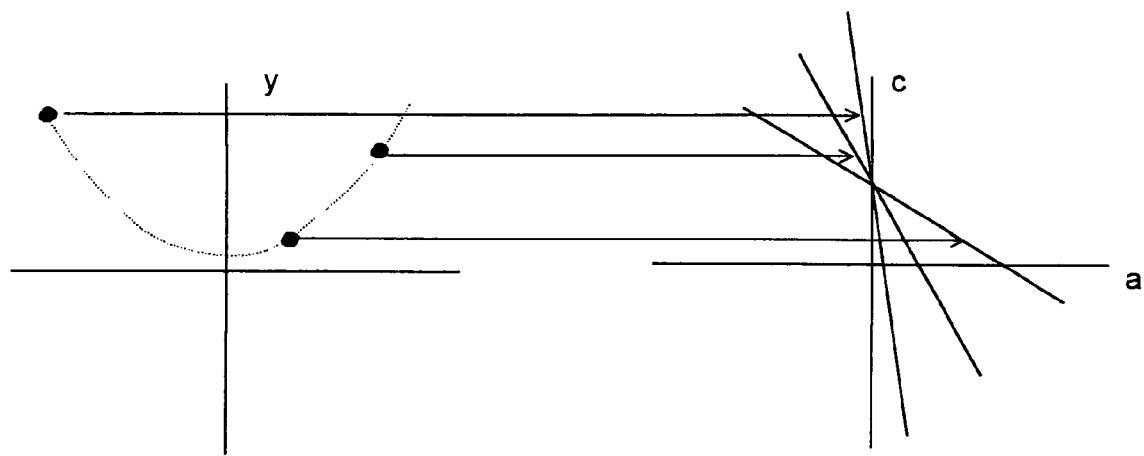
FIG. 3 is another graph that illustrates use of the Hough Transform for determining straight lines and parabolas that describe altitude changes along roads.

As shown in FIG. 3, N points in the x-y plane lie on a parabola $y=ax^2+c$. As described above, the Hough Transform of each point is a line in the a-c plane, as shown in FIG. 3. Each point on any of these lines in the a-c plane corresponds to a single parabola in the x-y plane. If the N lines in the a-c plane intersect at a point, then this point is the mapping in the a-c plane of that parabola in the x-y plane which contains all N points. In practice, the intersection points are detected using an accumulator, which divides the a-c plane into a grid. Each point which is on a parabola produces a vote in a cell in the accumulator. Cells with a large number of votes correspond to an intersection point, which means that a parabolic arc is present in the image in the (x,y) plane.

A general parabola $y=ax^2+bx+c$ can be detected by a direct extension of the above case. In this case, a three dimensional accumulator may be used.

The Hough transform can be used to identify all parabolic arcs (summit and sag vertical curves) and straight line segments of which a road segment is comprised (as shown in FIG. 1). Some post processing may be used to determine the start and end points of each parabola and straight line segment. The road segment is then modeled by equations of parabolas and straight line segments, instead of using a list of shape points and nodes. Thus, the shape of vertical curves will be expressed in closed form (i.e., via a mathematical expression) using this method.

Each point on a vertical curve of a road segment is thus represented by the equation of a straight line or of a parabola. Using the closed form expression for the vertical curve, a closed form expression for grade can be directly obtained by differentiating.

If a vertical curve contains a parabolic segment of the form $z=at^2+bt+c$, then the grade of the road along this parabolic segment is given by $$\text{grade} = \frac{dz}{dt} = 2at+b.$$

This has the following advantages. First, the grade so computed is more accurate than computing grade from shape points because it is based on a more accurate model of altitudinal variation. In addition, the grade can be obtained accurately at any point along the curve using the above model.

Figure 4:
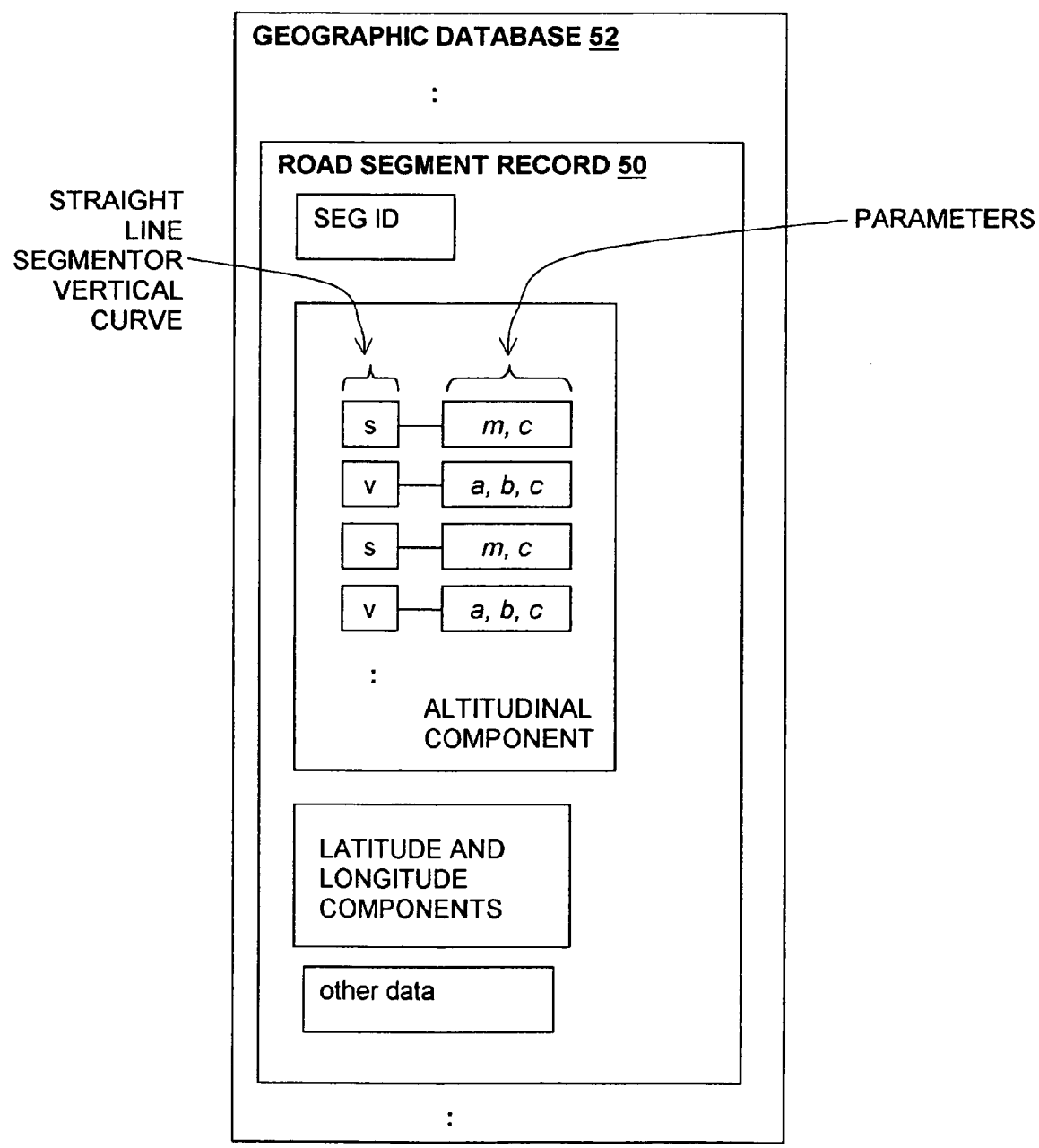
FIG. 4 is a diagram that shows components of a data record that uses straight lines and parabolic vertical curves to represent the altitudinal component of a road segment.
Figure 5:
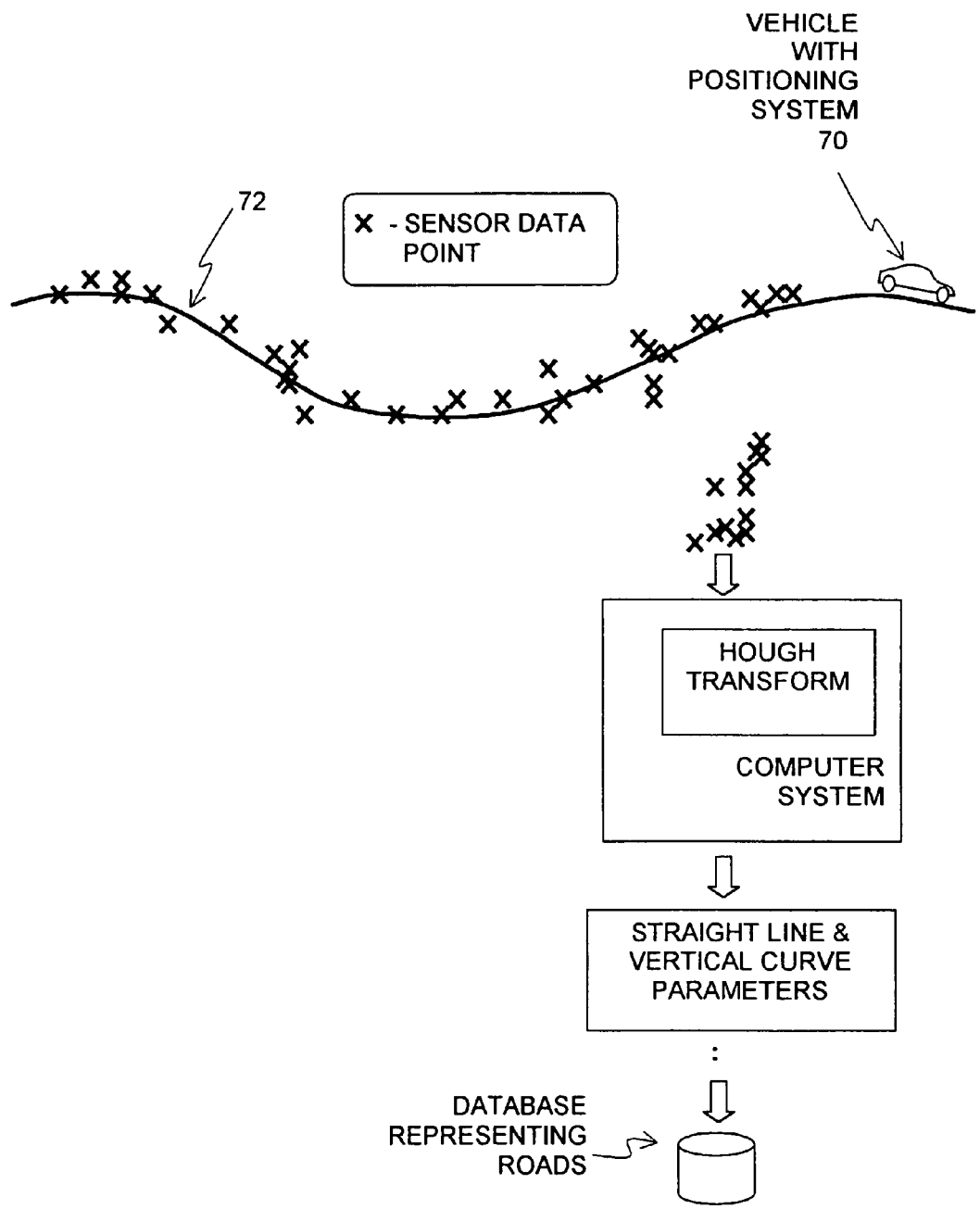
FIG. 5 is a diagram illustrating a process whereby a computer system using a Hough Transform can use position data collected by a vehicle to produce a geographic database that represents the altitudinal component of road geometry using straight lines and vertical curves.

FIG. 4 shows components of a data entity (or record) 50 contained in a geographic database 52. The geographic database 52 is stored on a computer readable data storage medium; the computer readable medium may be a CD-ROM, DVD, hard-drive or memory card. The data entity or record 50 represents a road segment. The components of the data entity 50 include attributes (i.e., fields, etc.) that describe features or aspects of the road segment. Among the aspects of the road segment that are represented by the attributes of the data entity 50 are attributes that represent the geometry (i.e., shape) of the road segment. Among the attributes that represent the geometry of the road segment are attributes that represent the altitudinal component of the road geometry. In FIG. 5, the altitudinal component of the geometry of the road segment is represented using straight lines and vertical curves, in particular parabolas. Each straight line is represented by parameters that define the equation of the straight line, i.e., slope, and intercept. Each vertical curve is represented by parameters that define the parabola, i.e., a, b, c. Other information may be associated with some or all the lines and vertical curves. The data record 50 may include information that indicates the extent of each line segment and vertical curve that corresponds to the represented road segment. The extent may be indicated by end points or in other ways.

III. Advantages

One advantage of using parabolas (obtained using the Hough Transform) for representing the altitudinal component of road geometry is that less data may be needed to represent roads with a desired level of accuracy, since the representation directly exploits the design of the altitudinal variation of roads. Thus, use of straight lines and parabolas obtained with the Hough Transform may be a more space efficient way to represent road geometry.

Another advantage of using the Hough Transform to determine lines and parabolas for representing road geometry is that the Hough Transform uses points along roads as an input. For purposes of representing the altitudinal component of road geometry, points that correspond to altitude at locations along a road segment can be obtained in various ways.

One way to obtain points that indicate altitude at locations along a road segment is to use a positioning system located in a vehicle. FIG. 5 shows a vehicle 70 traveling along a road 72. The vehicle 70 includes a positioning system that collects data indicating the positions (including altitude) of the vehicle as it travels along the road 72. The positioning system may use known technology, such as GPS, dead reckoning, or a combination thereof, to obtain the positions of the vehicle as it is being driven along roads in a geographic area. The positioning system may be part of a navigation system or may be a standalone system. The vehicle may be a data collection vehicle operated specially by a geographic database developer to collect position data along roads. Alternatively, the vehicle may be an end user's vehicle (i.e., a probe or floating car) that collects vehicle position data as it is being driven by the end user in normal everyday usage. Methods for collecting data using end user's vehicles are described in U.S. Pat. No. 6,047,234, the entire disclosure of which is incorporated by reference herein.

The points indicating altitudes at locations along roads, used as an input to the Hough Transform, may also be obtained from other sources. For example, points corresponding to locations along roads may be obtained from maps (paper or digital) or digital images which incorporate altitudinal variation. Altitudes at locations along roads on maps or images may be determined automatically or by observation by a human operator.

Other sources of points corresponding to altitude at locations along roads include existing digital maps. As mentioned above, existing digital maps may represent roads using shape points (e.g., the coordinates of points located along roads). Altitude information for these points may be used as an input to the Hough Transform thereby converting a digital database that represents the altitude along roads using shape points to a digital database that represents the altitude along roads using straight lines and vertical curves.

IV. Alternatives

In a geographic database in which the altitudinal component of road geometry is represented using straight lines and vertical curves, the horizontal component (i.e., the latitude and longitude) may also be represented using curves. In the case of the horizontal component, the curves may be circular arcs. Data defining the circular arcs that represent the horizontal components of the road geometry may be determined using the Hough Transform, as explained in the copending patent application entitled "APPLICATION OF THE HOUGH TRANSFORM TO MODELING THE HORIZONTAL COMPONENT OF ROAD GEOMETRY AND COMPUTING HEADING AND CURVATURE". Alternatively, the horizontal component of the road geometry may be represented using conventional means, such as shape points, or any other method.

It is intended that the foregoing detailed description be regarded as illustrative rather than limiting and that it is understood that the following claims including all equivalents are intended to define the scope of the invention.

I claim:

1. A navigation system comprising:
   a positioning system that collects data indicating a position;
   a computer readable storage medium storing a geographic database comprising altitudinal road geometry data defining straight line segments and vertical curves determined using a Hough Transform having an input of a plurality of altitude data points indicating altitudes at a plurality of locations along roads, wherein the altitudinal road geometry data representing straight line segments and vertical curves determined using the Hough transform have a data size less than a data size of said altitude data points; and
   a navigation-related application that uses said altitudinal road geometry data to provide a navigation-related feature, wherein said navigation-related feature includes at least one of: a map display, a route calculation, a route guidance, an adaptive cruise control and an adaptive lighting control.

2. The navigation system of claim 1 wherein the vertical curves are parabolas.

3. The navigation system of claim 1 wherein the horizontal component includes data defining straight line segments and circular arcs coinciding horizontally with the represented portions of roads.

4. The navigation system of claim 1 wherein the data defining said straight line segments and vertical curves comprise parameters.

5. The navigation system of claim 1 wherein the data defining said straight line segments and vertical curves further comprise data indicating end points of the straight line segments and vertical curves.

6. The navigation system of claim 1 wherein said data defining said straight line segments and vertical curves are determined using data indicating altitudes at a plurality of locations along the roads to provide an input to a Hough Transform.

7. The navigation system of claim 6 wherein said data indicating altitudes at said plurality of locations along the roads are obtained using a positioning system located in a vehicle traveling along the roads.

8. The navigation system of claim 7 wherein said vehicle is a probe vehicle.

9. The navigation system of claim 7 wherein said vehicle is operated by a geographic database developer.

10. The navigation system of claim 1 wherein said data indicating altitudes at said plurality of locations along the roads are obtained from maps.

11. A computer implemented method of representing roads in a geographic database comprising:
    providing a plurality of altitude data points indicating altitudes at a plurality of locations along roads;
    using the altitude data points to provide an input to a Hough Transform to determine straight line segments and vertical curves coinciding with the roads vertically;
    storing data representing said straight line segments and vertical curves to represent an altitudinal component of the geometry of the roads in the geographic database, wherein the stored data representing straight line segments and vertical curves have a data size less than a data size of said altitude data points; and storing said geographic database on a computer readable data storage medium.

12. The method of claim 11 further comprising forming the geographic database.

13. The method of claim 11 further comprising:

providing data indicating latitude and longitude at a plurality of locations along the road;

using the data indicating latitude and longitude to provide an input to a Hough transform to determine straight line segments and circular arcs coinciding with the road horizontally; and storing data defining said straight line segments and circular arcs to represent the horizontal component of the road geometry in the geographic database.

14. The method of claim 11 further comprising using the data representing geometry of the roads in the geographic database to provide a map display.

15. The method of claim 11 further comprising using the data representing geometry of the roads in the geographic database to provide a route calculation.

16. The method of claim 11 further comprising using the data representing geometry of the roads in the geographic database to provide a route guidance.

17. The method of claim 11 further comprising using the data representing geometry of the roads in the geographic database to provide an adaptive cruise control.

18. The method of claim 11 further comprising using the data representing geometry of the roads in the geographic database to provide an adaptive lighting control.

* * * * *